May 30, 1944.   R. H. GILLMOR   2,349,858
ADJUSTABLE AEROFOIL
Filed March 8, 1943
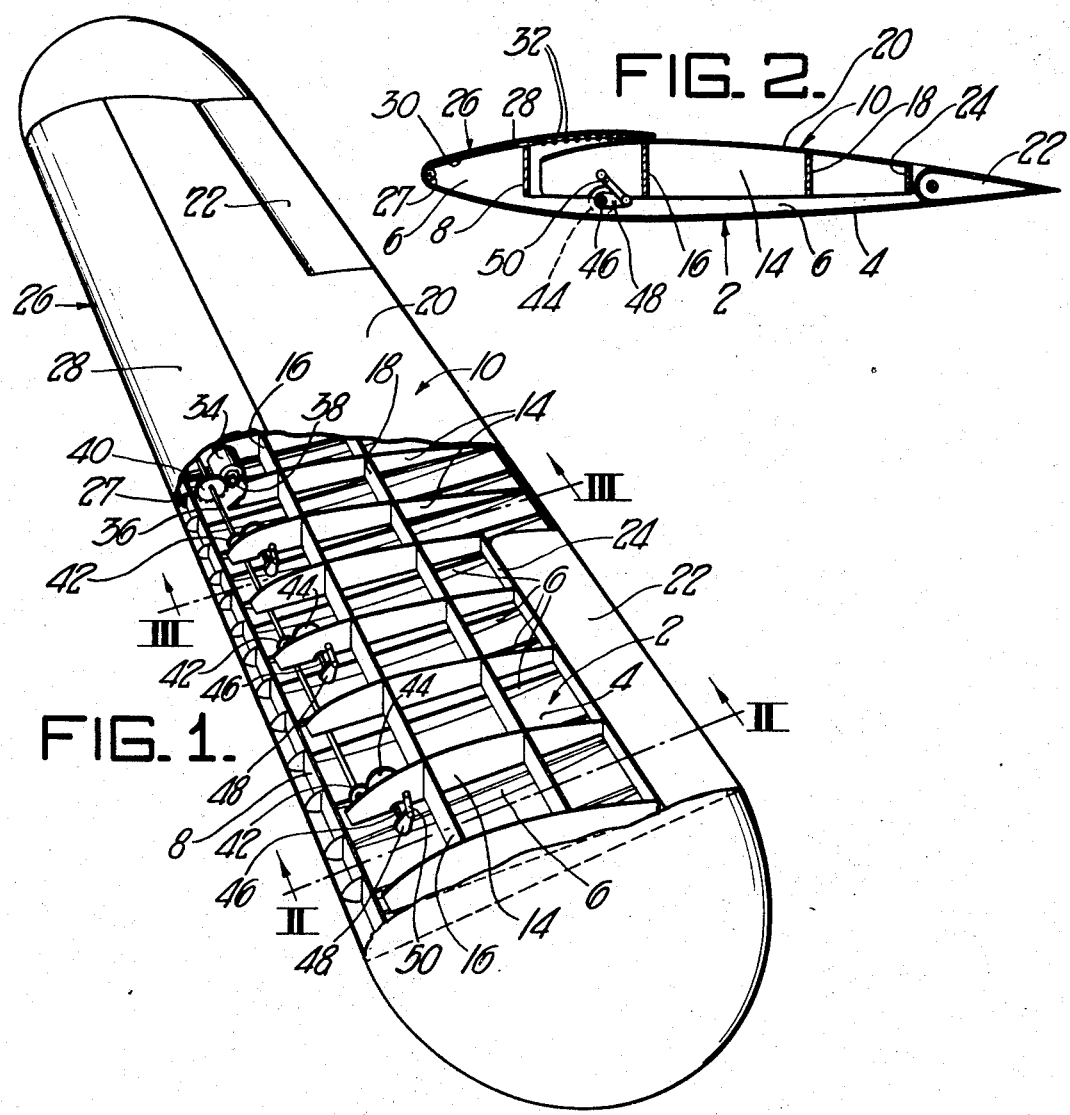
INVENTOR:
RICHARD. H. GILLMOR
BY: *John E. Jackson*
HIS ATTORNEY Patented May 30, 1944

2,349,858

UNITED STATES PATENT OFFICE 2,349,858

ADJUSTABLE AIRFOIL

Richard H. Gillmor, Wilkinsburg, Pa.

Application March 8, 1943, Serial No. 478,405

3 Claims. (Cl. 244—44)

This invention relates to an adjustable airfoil for wings and similar members of aircraft structures. In airplane and other flying machines the object of the wings and similar members is to deflect the air through an angle so as to obtain a lifting force due to the change of momentum in the air. It has been found that a thick or highly cambered wing has a larger lift per unit surface than a less cambered or thinner wing, but that the highly cambered wing has greater resistance to passage through the air at high speeds. Heretofore airplanes have been equipped with a fixed cambered wing which was a compromise between the highly cambered and less cambered wing. The result is that the aircraft so equipped cannot reach a maximum of efficiency at any altitude or speed.

It is an object of this invention to furnish an airfoil which is adjustable so as to obtain maximum efficiency at both low and high speeds.

This and other objects will be more apparent after referring to the following specification and attached drawing in which:

Figure 1 is a perspective view of the invention illustrating an entire wing with the fuselage omitted;

Figure 2 is a cross-section on the line II—II of Figure 1 showing the wing structure in a retracted position; and Figure 3 is a cross-section on the line III—III of Figure 1 showing the wing structure in an expanded position.

Referring more particularly to the drawing, the reference numeral 2 indicates the lower section of a wing which is fixed in the sense that its camber does not change and has a skin 4 fastened to a plurality of ribs 6 spaced longitudinally along the wing. Extending longitudinally between the ribs is a spar 8. An upper section 10 is pivotally mounted on the trailing edge of the wing by means of hinge 12. This section consists of a plurality of ribs 14 connected by means of a front spar 16 and an intermediate spar 18, and covered by means of skin 20. Certain of the ribs 14 are cut away to provide space for the aileron 22, a rear spar 24 being provided in front of the aileron to connect said cut away ribs. The nose 26 is pivotally mounted to the leading edge of the airfoil by means of hinge 27, and consists of a flexible steel panel 28 fastened to ribs 30 spaced along the length of the wing in the same manner as ribs 14. The ribs 30 have a plurality of rollers 32 on the upper end thereof for sliding engagement with the ribs 14.

The adjustable sections on each half of the wing are raised and lowered by any suitable means and, as shown, a motor 34 mounted adjacent the fuselage (not shown), drives shaft 36 by means of pinion 38 and gear 40. Spaced along the shaft 36 are a plurality of pinions 42 which mesh with corresponding gears 44 on crankshafts 46. Mounted on each of the shafts 46 is a crank 48 connected to section 10 by means of a link 50.

To obtain maximum lift the motor 34 is actuated to turn cranks 48 to the expanded position shown in Figure 3. As the crank rotates, it pivots the upper section 10 about the hinges 12, causing it to rise and with it the nose section 26 which is of sufficient width to overlap section 10 in any position. To obtain maximum speed and minimum air resistance, the cranks 48 are rotated to the position shown in Figure 2, with section 10 resting directly upon the ribs 6 and the nose 26 resting on the forward end of the ribs 6.

It will be seen that the variable camber of the wing will permit the elimination of the conventional flaps which are used to create drag to slow an airplane down, especially for landing. Increasing the camber of the wing has the effect of creating similar drag and has the added benefit of increasing the lift factor, which greatly increases the safety factor at landing speeds.

While one embodiment of the invention has been shown and described it will be apparent that other modifications and adaptations may be made without departing from the scope of the attached claims.

I claim:

1. In an airfoil, a lower section, a rigid upper section having a pivot connection with the trailing edge of said lower section, a movable nose section pivotally connected to the leading edge of said lower section and overlapping said upper section, said nose section comprising an outer skin fastened to a plurality of transverse ribs spaced longitudinally along the airfoil, means for causing relative movement of said sections about said pivot connections to vary the aerodynamic characteristics of the airfoil, and antifriction means mounted on said ribs engaging the top surface of said upper section to facilitate relative movement between the upper section and nose section.

2. In an airfoil, a lower section, a rigid upper section having a pivot connection with the trailing edge of said lower section, said upper section comprising an upper skin surface supported by longitudinal spars connected by transverse ribs, a movable nose section pivotally connected to the leading edge of said lower section and overlapping said upper section, and means for causing relative movement of said sections about said pivot connections to vary the aerodynamic characteristics of the airfoil.

3. In an airfoil, a lower section, a rigid upper section having a pivot connection with the trailing edge of said lower section, said upper section comprising an upper skin surface supported by longitudinal spars connected by transverse ribs, a movable nose section pivotally connected to the leading edge of said lower section and overlapping said upper section, said nose section comprising an outer skin fastened to a plurality of transverse ribs spaced longitudinally along the airfoil, means for causing relative movement of said sections about said pivot connections to vary the aerodynamic characteristics of the airfoil, and antifriction means mounted on said ribs engaging the top surface of said upper section to facilitate relative movement between the upper section and nose section.

RICHARD H. GILLMOR.